H. KOCOUREK.
TELESCOPING PULLEY.
APPLICATION FILED MAY 5, 1919.
1,363,471.                                        Patented Dec. 28, 1920.
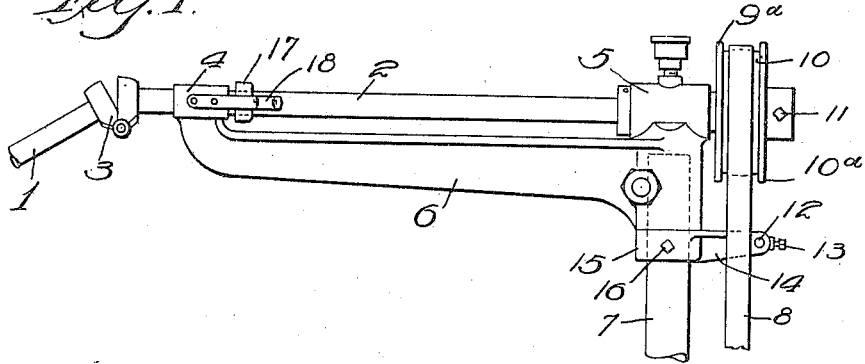
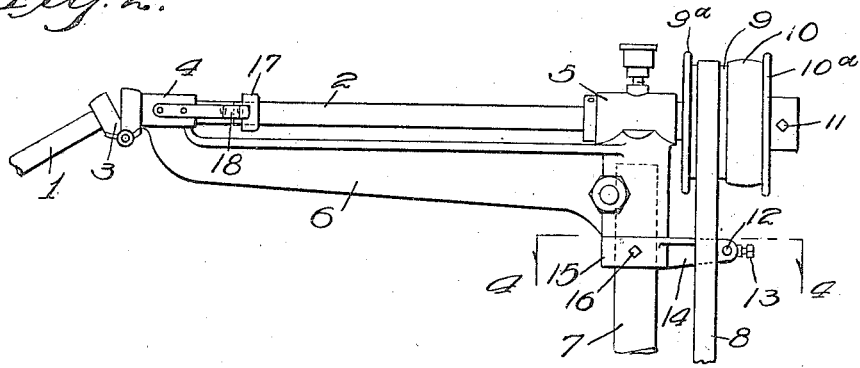
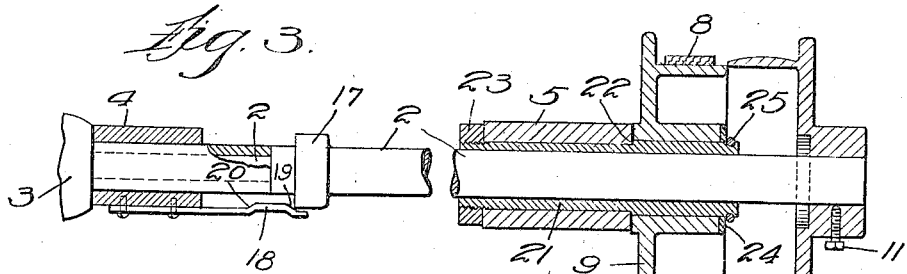
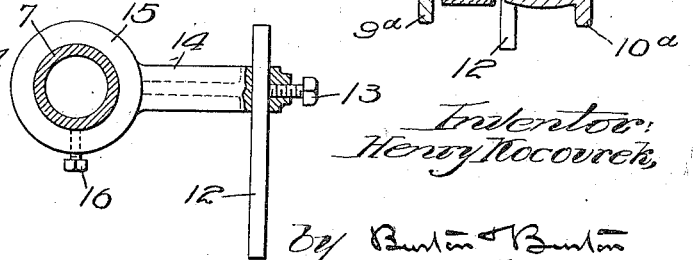
Inventor:
Henry Kocourek,
By Burton & Burton
his Attys.
Witness:

UNITED STATES PATENT OFFICE.

HENRY KOCOUREK, OF CHICAGO, ILLINOIS, ASSIGNOR TO CHICAGO FLEXIBLE SHAFT COMPANY, OF CHICAGO, ILLINOIS, A CORPORATION OF ILLINOIS.

TELESCOPING PULLEY.

1,363,471.   Specification of Letters Patent.   Patented Dec. 28, 1920.

Application filed May 5, 1919. Serial No. 294,827.

*To all whom it may concern:*

Be it known that I, HENRY KOCOUREK, a citizen of the United States, residing at Chicago, in the county of Cook and the State of Illinois, have invented certain new and useful Improvements in Telescoping Pulleys, of which the following is a specification, reference being had to the accompanying drawings, forming a part thereof.

This invention relates to certain features of a belt drive in which a tight and a loose driven pulley are alternately engaged with the belt by telescoping one within the other while holding the belt to a fixed course. It consists in the features and elements hereinafter described and shown in the drawings, as indicated by the claims.

In the drawings:

Figure 1 is a side elevation of a driven shaft and pulleys thereon embodying this invention, together with a mount for the same, and showing the tight pulley engaged with the belt.

Fig. 2 is a side elevation similar to Fig. 1 but showing the tight pulley shifted to permit engagement of the loose pulley by the belt.

Fig. 3 is a horizontal section taken axially through the driven shaft and on a larger scale to show details of construction.

Fig. 4 is a detail section taken as indicated at line, 4—4, on Fig. 2.

The invention is designed to take the place of the ordinary type of belt-shifting means, and is particularly adapted to a situation where the driven device or machine is a hand tool, as for example, a horse clipper or a sheep shear requiring close attention of the workman and the use of both his hands, either in guiding the tool or steadying the work. Such tools are frequently driven by means of jointed shafts, and the present invention permits the belt power to be applied or disengaged from the tool merely by a slight longitudinal movement of the shaft itself. In the drawings, 1 is the tube or sleeve in which the driven shaft leading to the tool is carried, such shaft being connected by a suitable joint to the driven shaft section, 2, and the carrying sleeves of the two sections being hinged together at 3. The driven shaft, 2, is journaled in bearings, 4 and 5, both formed on the bracket, 6, shown as supported on an upright post, 7, standing adjacent the driving belt indicated at 8. The shaft is provided with a loose pulley, 9, and a tight pulley, 10, the latter being secured by a set screw, 11, and the belt, 8, is confined to a single definite path by means of a guide rod, 12, secured by a set screw, 13, in a bracket arm, 14, having a hub or ring embracing the post or standard, 7, and fixed thereto by a set screw, 16.

The shaft, 2, is formed with a flange, 17, adjacent the bearing, 4, and secured to said bearing is a flat detent spring, 18, offset to form inclined shoulders, 19 and 20, adapted for engagement with the respective sides of the flange, 17, on the shaft, 2. Said shaft is longitudinally slidable in its bearings, so that when it is moved to one limit as shown in Fig. 1, the shoulder, 20, will engage said flange, 17, and when the shaft is shifted to its other limit, as shown in Fig. 2, the shoulder, 19, will engage the opposite side of said flange, 17, tending to retain the shaft in such position. In the first case, as shown in Fig. 1, the hollow tight pulley, 10, telescopes over and completely incloses the rim of the loose pulley, 9, so that there is presented for engagement with the belt, 8, only the rim of the pulley, 10, and said belt, 8, being confined between the flange, 9ª, of the loose pulley, 9, and the guide rod, 12, has no other course than to travel over and drive the pulley, 10. A flange, 10ª, is preferably provided for said pulley to assist in centering the belt thereon at the moment of shifting the pulley, 10, into the position shown in Fig. 1.

Now for disengaging the power from the shaft, 2, it is only necessary to slide the shaft longitudinally to the position shown in Figs. 2 and 3 with the shoulder, 19, engaging the flange, 17. By means of the guide rod, 12, which stands alongside the belt, 8, at that portion of the belt which is running toward the shaft, 2, the belt is prevented from following the pulley, 10, as it is moved longitudinally on its axis, and as the surface of the pulley, 9, is thus uncovered, the belt runs onto said pulley and ceases to drive the shaft, 2. Preferably, and to avoid any frictional drag of the loose pulley, 9, on the shaft, 2, a separate bearing is provided therefor in the form of a sleeve, 21, secured in the bearing, 5, and extending therefrom into the bore of the hub of the pulley, 9, by means of a shoulder, 22, engaging one end of the bearing, 5, and a nut, 23, screwed onto the other end of the sleeve, 21, the latter is secured in position, while a collar, 24, and spring-retaining ring, 25, serves to retain the pulley, 9, against endwise displacement.

I claim:

1. In combination with a driving belt, a shaft which is driven thereby, a pulley tight on said shaft, an adjacent pulley with respect to which the shaft revolves freely, dimensioned for telescoping within the tight pulley; guiding means arranged to confine the belt substantially to a single path in which the second mentioned pulley stands, and means for shifting the tight pulley axially over said second mentioned pulley to receive the belt therefrom and drive the shaft, the shaft being axially movable in its bearing for such shifting.

2. In the combination defined in claim 1 foregoing, means for yieldingly retaining said shaft at either limit of its shifting movement.

3. In the construction defined in claim 1 foregoing, the shaft having a pair of longitudinally separated abutments, and a fixed spring detent adapted to engage one or the other of said abutments at the respective limits of axial movement of the shaft.

4. In the combination defined in claim 1, a bearing for the shaft adjacent the loose pulley and comprising a bracket with a sleeve secured therein and extending beyond the bracket into the bore of the hub of the loose pulley as a bearing therefor.

5. In the combination defined in claim 1, a bearing for the shaft adjacent the loose pulley and comprising a bracket with a sleeve secured therein and extending beyond the bracket into the bore of the hub of the loose pulley as a bearing therefor, together with a collar on the end portion of said sleeve, adjacent the hub of said loose pulley, a groove formed in said sleeve beyond the collar, and a spring ring in the groove to retain the collar.

In testimony whereof I have hereunto set my hand at Chicago, Illinois, this 1 day of May, 1919.

HENRY KOCOUREK.